United States Patent [19]
Schulze et al.

[11] Patent Number: 5,480,158
[45] Date of Patent: Jan. 2, 1996

[54] ENTERTAINMENT INSTALLATION

[75] Inventors: Ullrich Schulze, Wiesbaden; Juergen Schattauer, Hueffelsheim; Horst Heinen, Stromberg; Konrad Rieck, Bingen, all of Germany

[73] Assignee: NSM Aktiengesellschaft, Bingen, Germany

[21] Appl. No.: 256,743

[22] PCT Filed: Jan. 18, 1993

[86] PCT No.: PCT/DE93/00045

§ 371 Date: Jul. 21, 1994

§ 102(e) Date: Jul. 21, 1994

[87] PCT Pub. No.: WO93/14843

PCT Pub. Date: Aug. 5, 1993

[30] Foreign Application Priority Data

Jan. 22, 1992 [DE] Germany .......................... 42 01 555.3

[51] Int. Cl.⁶ ...................................................... A63F 9/22
[52] U.S. Cl. ............................................. 273/434; 273/460
[58] Field of Search ........................... 273/138 R, 138 A, 273/143 R, 433, 434, 460, DIG. 28, 237, 238, 239, 148 R, 85 G; 434/128, 129

[56] References Cited

U.S. PATENT DOCUMENTS 4,339,798 7/1982 Hedges et al. ...................... 273/138 A
4,357,015 11/1982 Santora et al. ...................... 273/142 E
5,259,613 11/1993 Marnell, II ......................... 273/138 A

FOREIGN PATENT DOCUMENTS 0292465 11/1988 European Pat. Off. .
2579050 9/1986 France .
518661 3/1972 Switzerland .
1103011 2/1968 United Kingdom .................. 273/237

*Primary Examiner*—Jessica J. Harrison
*Attorney, Agent, or Firm*—Spencer, Frank & Schneider

[57] ABSTRACT

An entertainment installation includes at least one entertainment device defining a game area and having first actuation members thereon. A video recording device is associated with the entertainment device for monitoring the game area thereof. A projector is operatively connected to the video recording device for projecting an image of the game area. A projection screen displays the image of the game area projected by the projector. At least one control console is operatively connected to the entertainment device and associated with the projection screen. The control console has second actuation members thereon functionally identical to the first actuation members on the entertainment device and is thereby adapted to operate the entertainment device.

9 Claims, 3 Drawing Sheets

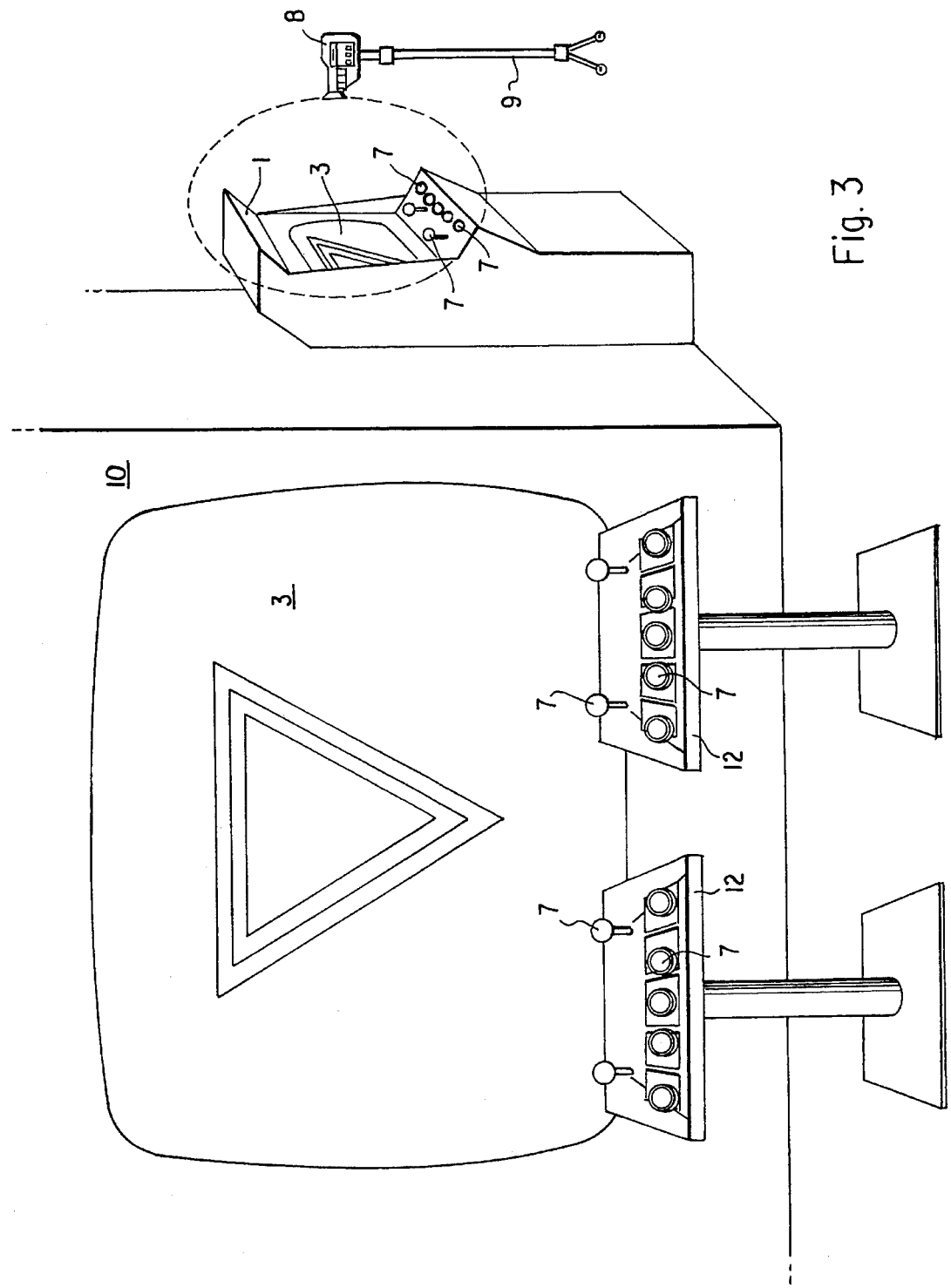

ENTERTAINMENT INSTALLATION

FIELD OF THE INVENTION

The invention relates to an entertainment installation with at least one entertainment device having a game area.

1. Background of the Invention

Entertainment devices are known in the most diverse embodiments. They are designed as game devices with or without a chance to win money, as co-called flippers, as billiard games, as dart games, as video games or the like. Various steps have already been taken to induce a user or player to use such entertainment devices and to provide the user with reasonable entertainment in the course of the game.

2. Summary of the Invention

It is the object of the invention to make the course of the entertainment and the design options of an entertainment device of the type mentioned at the outset more varied and to provide a greater inducement for playing in order to increase the entertainment value for the user in this way.

This object is attained in accordance with the invention by a video recording device covering, or monitoring the game area, a projector connected with the video recording device, and a projection screen onto which the recorded game area can be projected.

By means of the above it is possible for the player to follow exactly the details of the game progression of the entertainment device, particularly if the projection screen is a large projection screen, and this represents a special entertainment value for the player. Furthermore, players not participating in the game can follow the game without interfering with the player and can give the player appropriate tips and advice on how to design the further course of the game. In addition, there is the option of several people joining to form a player group and to operate the entertainment device together by virtue of the easy observation possibility of the projected game area.

A control console connected with the entertainment device is associated with the projection screen in order to allow operation of the entertainment device from a suitable place in front of the projection screen. The same actuation members are provided on the control console as are on the entertainment device, that is to say, the actuation members on the control console are functionally identical to the actuation members on the entertainment device so that the player can operate them without having direct visual contact with the latter.

In accordance with an advantageous further embodiment of the invention, individual sections of the game area on the projection screen can be displayed in an enlarged or reduced scale by means of a key or computer control unit. This results in a variety of design options for the projected image, because it is possible to project particularly interesting sections of the real game area in a large size and less interesting sections of the real game area in a small size simultaneously or sequentially in time.

So that continuing entertainment can be offered to the player even during pauses in the game or during "boring" phases of the game, video clips, television programs, films or slides can be shown on the projection screen in accordance with a further advantageous embodiment of the invention.

In order to attain a continuous incentive for playing, the game area and a video clip, a television program, a film or a slide can suitably be simultaneously displayed on the projection screen. In this connection the simultaneous projection of the game area and the video clip or the like in different formats can be performed via key or computer control.

In accordance with a further advantageous embodiment of the subject of the invention it is possible to project several different game areas simultaneously on the projection screen, wherein a separate control console is assigned to each projected image. By means of this a novel entertainment experience is provided in that the individual player can watch the game areas of the other players at the same time and in this way can observe their game tactics.

To realize a simple video recording device, it is suitably embodied as a camera disposed spatially in front of the game area of the entertainment device.

In accordance with an advantageous further embodiment of the invention, the projector is disposed behind the projection screen in order to obtain on the one hand a clean projected image and, on the other, to provide a place for the projector where it is not in the way.

It is furthermore advantageously provided to embody the control console as a remote control unit. This results in a particularly simple connection between the control console and the entertainment device.

BRIEF DESCRIPTION OF THE DRAWINGS

The concept on which the invention is based will be explained in detail in the following description by means of three exemplary embodiments illustrated in the drawings. Shown are in.

DETAILED DESCRIPTION OF THE PREFERRED EMBODIMENTS

Figure 1:
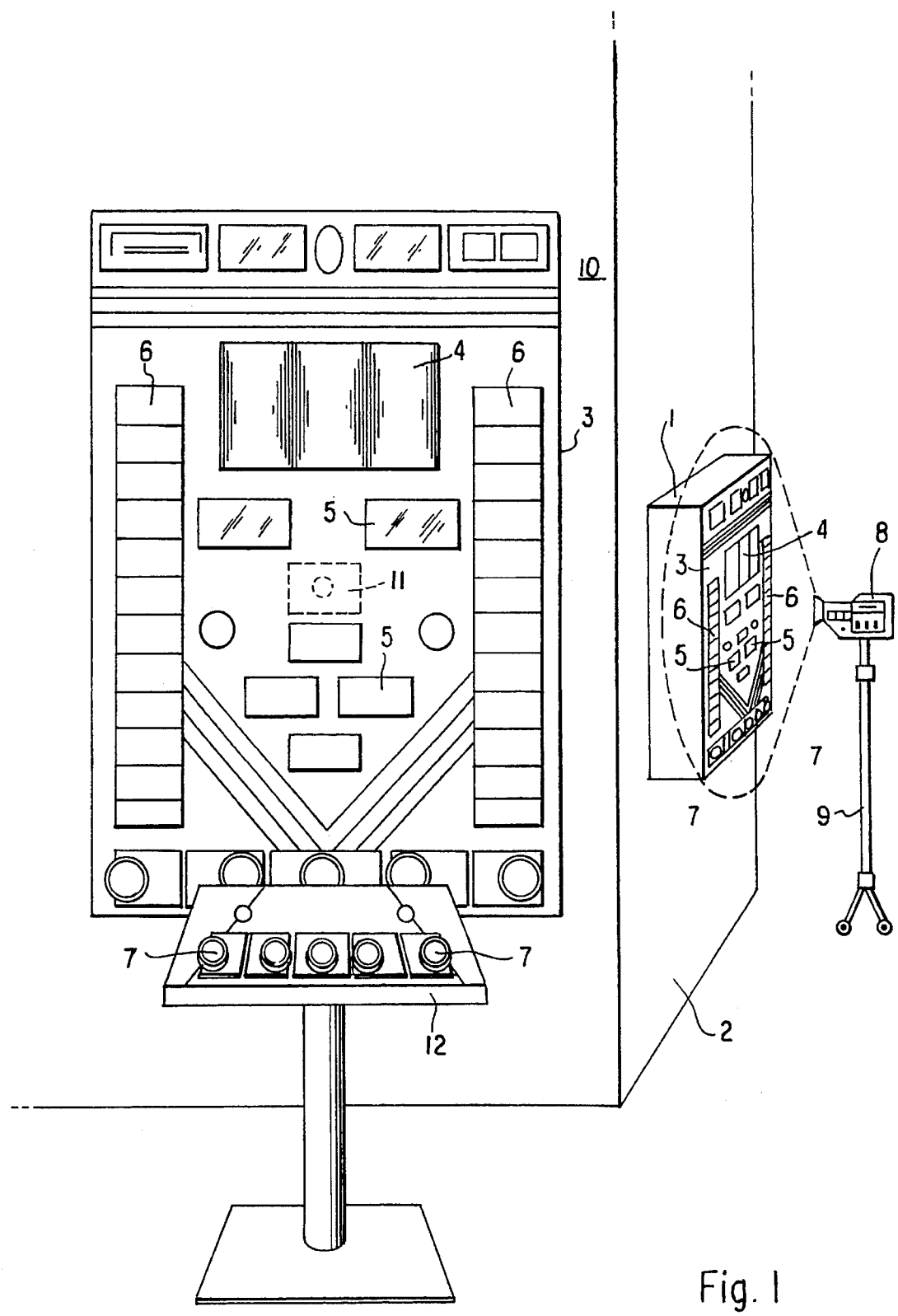
FIG. 1, a plan view of an entertainment installation in accordance with the invention with an entertainment device embodied as a money-operated gambling machine.

In the entertainment installation in accordance with FIG. 1, an entertainment device 1 embodied as a money-operated gambling machine is suspended on a wall 2. On its front, which is designed as the game area 3, the entertainment device 1 essentially has a game device 4 comprising symbols, various indicators 5, two ladders 6 for risky play and various operating elements 7. A video recording device 8 in the form of a camera fixed on a tripod 9 is placed in the space in front of the game area 3 of the entertainment device 1.

A projector 11 connected with the video recording device 8 is disposed behind a projection screen 10, by means of which the game area 3 of the entertainment device 1 recorded by the video recording device 8 is projected on the projection screen 10. A control console 12, which is also equipped with the operating elements 7 of the entertainment device 1, stands in front of the projection screen 10. In this way it is possible to affect the progress of the game of the entertainment device 1 by means of the operating elements 7 embodied as a remote control unit while watching the game area 3 projected on the projection screen 10. In this way a so-called "money game movie" is offered to the player.

Figure 2:
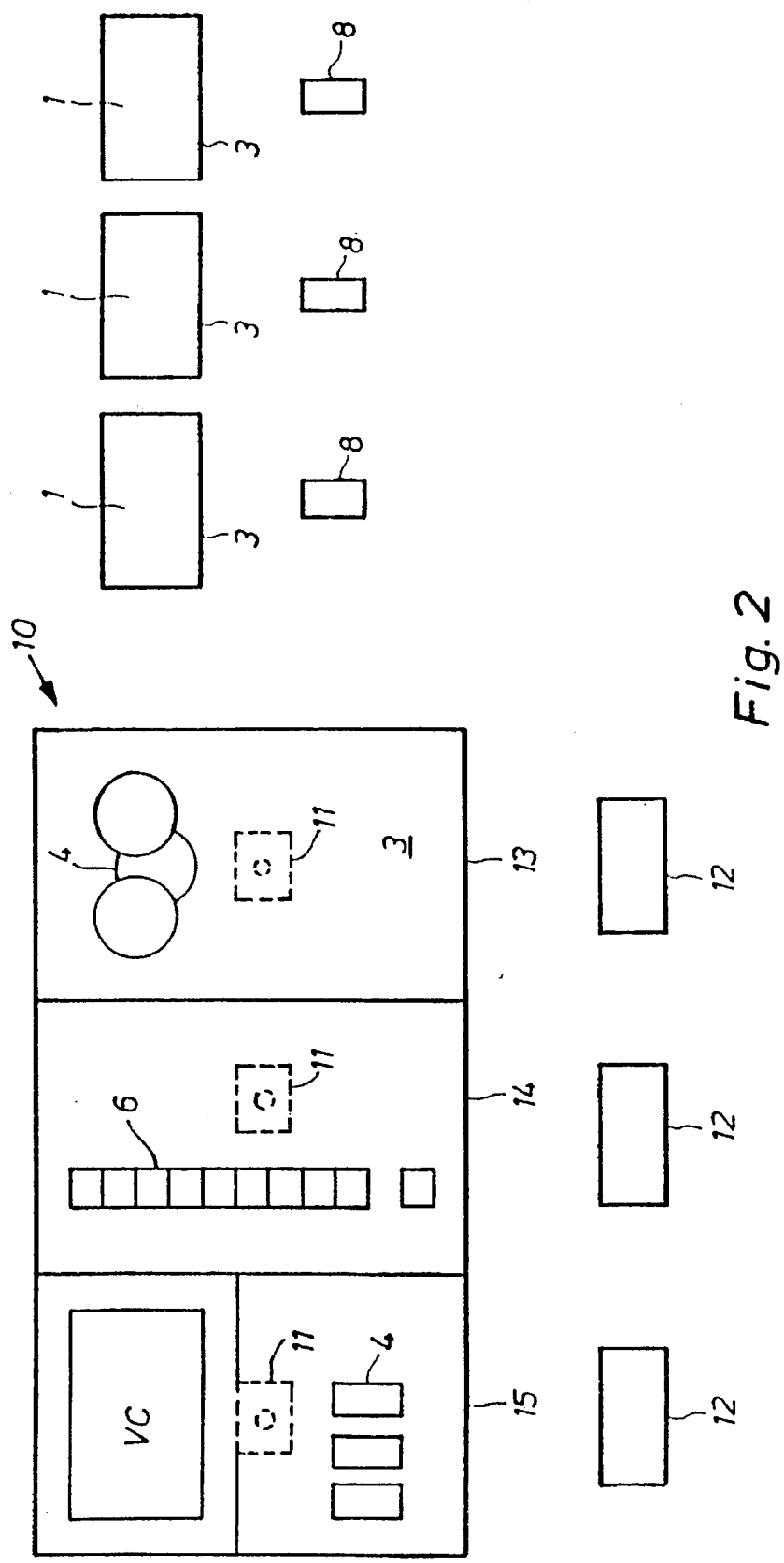
FIG. 2, the design in principle of an entertainment installation of the invention with several entertainment devices embodied as money-operated gambling machines, and FIG. 3, an entertainment installation in accordance with the invention with an entertainment device designed as a screen game device.

An entertainment installation with three entertainment devices 1 embodied as money-operated gambling machines is illustrated in FIG. 2, wherein one video recording device 8 is arranged in front of each game area 3. All game areas 3 can be projected onto the projection screen 10 via projectors 11 connected to the video recording devices 8. In this case a control console 12 is associated with each corresponding partial area 13, 14, 15 of the projection screen 10. The entire game area 3 is represented in the partial area 13, and in the partial area 14 only the risky play ladder 6 in enlargement. The symbol game device 4 is shown in the lower half of the partial area 15, while a video clip VC is running in the upper half of the partial area 15 as a result of the arrangement of an appropriate device. It is possible to display individual sections of the game area, so-called play futures, on the projection screen 10 in large or small format controlled by keys or preselected by computer, depending on the choice of the player. Besides video clips, it is furthermore also possible to offer television programs, films or slides on the projection screen. Because of the breadth of variations of the various offerings and their representation in different sizes and clippings there is a great breadth in variation of the entertainment.

An entertainment device 1 is used in the entertainment installation of FIG. 3, which is embodied as a screen game device with two places for playing. Accordingly, two control consoles 12 have been assigned to the projection screen 10, so that competitive games can be played, watching the projected game area 3.

The invention is not limited to the exemplary embodiments shown and explained. It also encompasses all variations and further embodiments possible for one skilled in the art, as well as partial and/or sub-combinations of the described and/or illustrated characteristics and measures.

We claim:

1. An entertainment installation comprising:

at least one entertainment device defining a game area;

first actuation members operatively connected to the entertainment device for operating the entertainment device;

a video recording device associated with the entertainment device for monitoring the game area thereof;

a projector operatively connected to the video recording device for projecting an image of the game area;

a projection screen for displaying the image of the game area projected by the projector; and at least one control console operatively connected to the entertainment device and associated with the projection screen, the control console having second actuation members thereon functionally identical to the first actuation members of the entertainment device, the second actuation members thereby being adapted to operate the entertainment device.

2. The installation according to claim 1, further including means for enlarging or reducing the image of the game area projected onto the projection screen.

3. The installation according to claim 1, further including means for projecting onto the projection screen at least one of a video clip, a film and a slide.

4. The installation according to claim 1, further including means for simultaneously projecting onto the projection screen the image of the game area together with at least one of a video clip, a television program, a film and a slide.

5. The installation according to claim 4, wherein the means for simultaneously projecting includes at least one of a computer control unit and a key control unit.

6. The installation according to claim 1, wherein:

the at least one entertainment device includes a plurality of entertainment devices; and the at least one control console includes a plurality of control consoles, respective ones of the control consoles being associated with respective ones of the entertainment devices;

the installation further including means for simultaneously projecting onto the projecting screen images of game areas of respective ones of the entertainment devices.

7. The installation according to claim 1, wherein the video recording device is a camera disposed in front of the game area of the entertainment device.

8. The installation according to claim 1, wherein the projector is disposed behind the projection screen.

9. The installation according to claim 1, wherein the control console comprises a remote control unit.

* * * * *